UNITED STATES PATENT OFFICE 2,508,911

PROCESS FOR THE SEPARATION OF NEUTRAL PHTHALIC ACID ESTERS

Philip James Garner, Hooton, and Gordon Watson, Accrington, England, assignors to Shell Development Company, San Francisco, Calif., a corporation of Delaware No Drawing. Application April 19, 1948, Serial No. 21,867. In Great Britain October 6, 1947

9 Claims. (Cl. 202—57)

This invention relates to the separation of neutral phthalic acid esters from reaction mixtures in which said esters are contained.

As employed herein, the terms "neutral phthalic acid esters," or simply "neutral esters," refer to those esters of phthalic acid wherein both carboxyl groups are esterified by an alcohol capable of being volatilized by steam. Thus, for example, the esters may be derived from such alcohols as methyl, ethyl, primary and secondary propyl, and primary, secondary and tertiary butyl, amyl and hexyl alcohols, and their higher homologues, or from benzyl, phenylethyl, cinnamic, or allyl alcohols and their homologues. The term is also intended to embrace those neutral phthalates formed by reacting phthalic acid or anhydride with mixtures of such alcohols, including the technical mixture of alcohols derived from olefinic mixtures obtained, in turn, by cracking paraffin wax or other petroleum fractions. Esters derived from the alcohols produced by the so-called OXO process also fall within the term "neutral phthalic acid esters."

The terms "acid phthalic acid esters," or "acid esters," as employed herein, refer to those compounds wherein only one of the carboxyl groups of phthalic acid is esterified by an alcohol of the type described in the preceding paragraph, the other carboxyl group remaining in the unesterified form.

Phthalic acid esters are produced by a variety of known processes. Thus, the esterification may be effected by heating phthalic acid and/or phthalic anhydride with the desired alcohol or alcohols, the reaction being carried on in either the presence or absence of a catalyst, as hydrogen chloride, sulfuric acid or p-toluene sulfuric acid, and with or without the addition of an organic liquid, as benzene or toluene, capable of forming an azeotropic mixture with water formed during the reaction. Whatever the reaction mechanism employed to form the ester, there is normally obtained a reaction mixture which, in addition to the desired neutral ester, contains acid ester in varying amount, together with excess acid and alcohol reactants and any catalyst or residual azeotrope-forming liquid employed.

It is known to separate the neutral ester from the other components of the reaction mixture by washing with aqueous caustic solution, but this procedure is frequently accompanied by practical difficulties which lower the over-all efficiency of the separation. One such difficulty is the tendency of the neutral ester and alkaline layers to form an emulsion, a condition which renders difficult the subsequent separation of the alkaline phase from the neutral ester portion. Moreover, the neutralization of the acid esters by the added alkali is a slow reaction under many conditions, and since the acid esters have a substantial solubility in the neutral esters at room temperature, considerable amounts of the acid ester may remain even after repeated alkaline addition and subsequent separation steps. It is of particular importance that the neutral ester be freed of any acid ester impurities, for the latter appear to catalyze the decomposition of the neutral esters during their distillation, with the resultant deposition of phthalic anhydride and blocking of the distillation unit.

It is therefore an object of the present invention to provide an improved method for the purification of neutral phthalic acid esters. A more particular object is to provide an efficient method for achieving complete separation of neutral phthalic acid esters from reaction mixtures in which said esters are contained. Another object is to provide a method whereby neutral phthalic acid esters may be freed of their content of acid phthalic acid esters. Still other objects will become apparent from the following description of the invention.

It has been discovered that excellent separation of neutral phthalic acid esters from reaction mixtures containing the said esters, and from which any water and excess alcohol may or may not have been removed, can be obtained by steam-distilling the mixture while maintaining the same in the alkaline condition, i. e., at a pH of 8 or above and preferably between pH 8 and pH 9. The distillation with steam is continued until the resulting distillate is substantially alcohol-free, a condition which is indicative of the complete separation of the neutral ester from any acid ester present through hydrolysis of the latter. As the pH of the mixture is established below 8, separation of neutral and acid esters in this manner becomes too slow for practical operation, and in many cases is incomplete. On the other hand, as the pH is raised appreciably above 9, a portion of the neutral ester may be hydrolyzed along with the acid ester. The process of the present invention is applicable to the isolation of all neutral esters of phthalic acid of the type derived from any alcohol which is volatile in steam.

The alkalinity of the reaction mixture undergoing treatment for separation of its neutral ester constituent may be adjusted in any convenient manner through addition of an alkaline material. The preferred method is to add an aqueous solution of an alkali metal, or ammonium, hydroxide or carbonate, these compounds being selected inasmuch as the resulting phthalic acid salts formed therefrom are water-soluble. Suitable compounds for this purpose are, for example, sodium hydroxide, sodium carbonate, potassium hydroxide, potassium carbonate, lithium hydroxide, lithium carbonate, ammonium hydroxide and ammonium carbonate, though other alkaline compounds may be used.

The process of this invention is applicable to the treatment of crude mixtures resulting from the esterification of phthalic acid and/or phthalic anhydride by any of the known techniques; thus, the esterification may be effected merely by heating any alcohol volatile in steam with phthalic acid or anhydride either with or without a catalyst, as sulfuric acid. In such cases, an aqueous phase may be present together with a crude ester phase, and this aqueous phase may, if desired, be separated from the ester phase before the mixture is made alkaline and steam-distilled. The esterification may also be effected by heating the acid or anhydride with any steam-volatile alcohol in the presence of an organic liquid which is distilled off in azeotropic form with the water formed during the reaction. In such cases, the purification step of this invention, viz., steam distillation under alkaline conditions, is applied directly to the crude reaction mixture. The process of the invention is, however, applicable to the treatment of phthalic acid esters produced by other means as well.

In the preferred practice of the invention the crude reaction mixture is first subjected to steam-distillation before being made alkaline in order to remove excess alcohol and any other steam-volatile organic liquids present. The alkalinity of the solution is then adjusted to pH 8 or above, as by addition of a dilute aqueous sodium hydroxide, or potassium hydroxide solution, following which steam-distillation is again initiated.

Whether or not the excess alcohol be distilled prior to the addition of alkali, as suggested in the foregoing paragraph, it is of great importance to the practice of the present invention that the pH be maintained above pH 8, and preferably between pH 8 and pH 9, during the subsequent steam-distillation treatment, the alkalinity being controlled by the addition of such further quantities of the base as may be necessary.

As the now-alkaline reaction mixture is steam distilled, any acid ester present is hydrolyzed and thereafter converted into salt form, the application of steam to the reaction mixture not only effecting hydrolysis of the acid ester portion, but also speeding up the neutralization of the resultant acid and the solution of the salt in the aqueous alkaline phase. Simultaneously, the alcohol formed in the hydrolysis step, together with any other alcohol present, is distilled over with the excess steam leaving the mixture. Surprisingly, and contrary to the prediction which might otherwise be made, the neutral phthalic acid ester does not hydrolyze during this steam-distillation treatment, particularly if the pH of the mixture is controlled within the range 8 to 9. In addition to effecting removal of the acid esters by selectively hydrolyzing the same, the steam may also facilitate isolation of the neutral esters by means of other effects of which we are not at present aware. Thus, we have found that isolation of the neutral esters is most easily effected if, after the steam-distillation under alkaline conditions, the aqueous alkaline phase is separated from the neutral ester phase while the mixture is still hot, a result perhaps attributable to reduced emulsion formation at the high temperature here prevailing.

The steam-distillation of the alkaline reaction mixture is preferably discontinued when no further quantity of alcohol is recovered in the distillate, a substantially alcohol-free distillate being indicative of complete hydrolysis of the acid ester present in the mixture.

We have found that the present process is particularly useful in the preparation of neutral esters of phthalic acid for use as plasticizers in the synthetic resin industry. These esters usually have four or more carbon atoms in each alkyl or substituted alkyl radical, and dialkyl phthalates of this type prepared by the known technique are liable to decompose during vacuum distillation causing blockage of the distillation apparatus by sublimed phthalic anhydride. We have found that the dialkyl phthalates isolated from esterification mixtures by the process of the present invention can be vacuum distilled without decomposition.

The following examples illustrate the manner in which the present invention find preferred embodiment, all parts being in terms of parts by weight.

*Example I*

A mixture comprising 32.5 parts of octanol-2, 14.8 parts of phthalic anhydride and 50 parts xylene, is refluxed for 85 minutes to form the acid phthalate in a vessel from which the water formed during the reaction is removed as a water-xylene azeotrope. There was then added 0.325 part of p-toluene sulfonic acid, after which refluxing was continued until the theoretical quantity of water, indicative of complete neutral ester formation, had been collected. The contents of the reaction vessel were then steam-distilled until no further quantities of octanol-2 and xylene appeared in the distillate. An aqueous sodium hydroxide solution (2%) was then added until the mixture was just alkaline to phenolphthalein, following which steam-distillation was continued. Small additions of the alkaline solution were made from time to time during the distillation treatment so as to maintain the desired alkalinity, and the steam treatment was deemed complete when no further quantities of octanol were recovered in the distillate. The neutral ester and aqueous phases were then separated while still hot, following which the ester was washed with water until neutral to Universal Indicator and then dried over sodium sulfate and decolorized by percolating over charcoal. The dioctanol-2-phthalate product was capable of being distilled in vacuo without decomposition.

Benzene or toluene may be used in place of the xylene referred to above.

*Example II*

In this operation 49 parts of phthalic anhydride and 92 parts of 2-ethylhexan-1-ol are mixed and refluxed through a one inch column packed with activated alumina for a period of 4 hours. The reaction mixture is then steam-distilled to remove unreacted alcohol. Following removal of the excess alcohol, 2% aqueous sodium hydroxide solution is added until the mixture is just alkaline to phenolphthalein whereupon steam-distillation is continued until no further quantities of alcohol are recovered in the distillate, the mixture being maintained just alkaline to phenolphthalein throughout the course of the steam-distillation treatment. The resulting di(2-ethylhexyl-1)-phthalate is separated while still hot from the aqueous phase, after which it is washed with water until neutral to Universal Indicator and dried over sodium sulfate.

*Example III*

In this operation 347 parts of a mixture of secondary octyl and nonyl alcohols, together with 148 parts phthalic anhydride, 3.6 parts sulfuric acid and 132 parts of benzene, were placed in a suitable vessel and refluxed for 10 hours at 109° C. to 111° C., the water formed during the reaction (17 parts) being removed as a water-benzene azeotrope. Esterification being then deemed complete, the reaction mixture is steam-distilled to remove benzene together with excess alcohols and any olefin formed by dehydration of the alcohols. Sufficient 2% aqueous sodium hydroxide is then added to make the mixture just alkaline to phenolphthalein and the steam-distillation is continued, with additional aqueous sodium hydroxide being added during the distillation to keep the mixture alkaline to phenolphthalein. Distillation is stopped when it appears that no further quantity of alcohol is condensing with the steam. The mixed neutral esters are separated from the aqueous layer while the mixture is still hot, said esters being thereafter washed with water until neutral to Universal Indicator. They are then dried by hot air at 110° C. to 120° C. and decolorized by percolation over anhydrous sodium carbonate. An 85% yield of a mixture of di-secondary octyl and nonyl phthalates is obtained.

It will be appreciated that the specific description of the present process given in the above examples is capable of numerous variations. Thus, in large scale operation the pH of the reaction mixture could be controlled by a pH electrode fixed in the distillation vessel and aqueous sodium hydroxide or other alkaline solution can be added manually or automatically to maintain the required pH as the base is used up in neutralizing and saponifying the acid ester. It is preferred to use bases such as sodium, potassium or ammonium hydroxide or carbonate which give water-soluble salts of phthalic acid for rendering the reaction mixture alkaline.

It is preferred during the steam-distillation treatment of this invention to maintain the pH between 8 and 9 to minimize any possibility of hydrolyzing the neutral ester. Although a pH greater than 9 can be employed the upper limit of the alkalinity is not capable of strict definition since clearly it will vary with the facility with which the neutral ester hydrolyzes. In some cases it may be desirable to work at higher alkalinities and to permit a minor amount of hydrolysis of neutral ester to take place since a higher alkalinity, although it may reduce the over-all yield of neutral ester, may give a substantially purer product.

The invention claimed is:

1. The method of treating a system containing a neutral phthalic acid ester together with acid phthalic acid ester of the type which on hydrolysis yields an alcohol volatile with steam, said method comprising establishing a pH of at least 8 in the system through addition of an alkaline material, and steam distilling the alkaline system while maintaining said pH therein until an alcohol-free distillate is obtained, said method being characterized by the selective hydrolysis of said acid ester component of the system.

2. The method of claim 1 wherein the pH of the system is established between the range pH 8 and pH 9 and is maintained in that range during the steam-distillation step.

3. The method of claim 1 wherein the alkaline material is an aqueous solution of a compound selected from the group consisting of alkali metal and ammonium hydroxides and carbonates.

4. In a method of separating neutral phthalic acid ester from a reaction mixture in which said ester is produced, the steps comprising steam distilling the reaction mixture to remove excess alcohol therefrom, making the alcohol-free mixture alkaline to phenolphthalein through addition of an aqueous solution of a compound selected from the group consisting of alkali metal and ammonium hydroxides and carbonates, and steam distilling the alkaline mixture until an alcohol-free distillate is obtained, the mixture being maintained in the alkaline to phenolphthalein condition during the last named steam-distillation step through addition of said aqueous solution.

5. The method of claim 4 wherein the pH of the mixture is maintained within the range pH 8 to pH 9 during the last named steam-distillation step.

6. In a method of separating neutral phthalic acid ester from a reaction mixture obtained by reacting an alcohol of the type which may be volatilized by steam with a compound selected from the group consisting of phthalic acid and phthalic anhydride, the steps comprising establishing a pH of at least 8 in the reaction mixture, and subjecting the mixture of established pH to distillation with steam until a substantially alcohol-free distillate is obtained.

7. The method of claim 6 wherein the reaction mixture is maintained at a pH of at least 8 during the steam-distillation treatment.

8. The method of claim 6 wherein the reaction mixture is maintained at from pH 8 to pH 9 during the steam-distillation step.

9. The method of claim 6 wherein the reaction mixture is made just alkaline to phenolphthalein and is thereafter maintained in that condition during the steam-distillation step.

PHILIP JAMES GARNER.
GORDON WATSON.

REFERENCES CITED

The following references are of record in the file of this patent:

UNITED STATES PATENTS

| Number | Name | Date |
|---|---|---|
| 1,554,032 | Reid | Sept. 15, 1925 |
| 1,643,393 | Reid et al. | Sept. 27, 1927 |
| 1,764,022 | Jaeger | June 17, 1930 |
| 1,993,736 | Graves | Mar. 12, 1935 |
| 2,011,707 | Borglin | Aug. 20, 1936 |
| 2,076,111 | Bannister | Apr. 6, 1937 |
| 2,091,241 | Kvalnes | Aug. 24, 1937 |
| 2,237,729 | Evans et al. | Apr. 8, 1941 |
| 2,249,768 | Kropa | July 22, 1941 |